Figure 3:
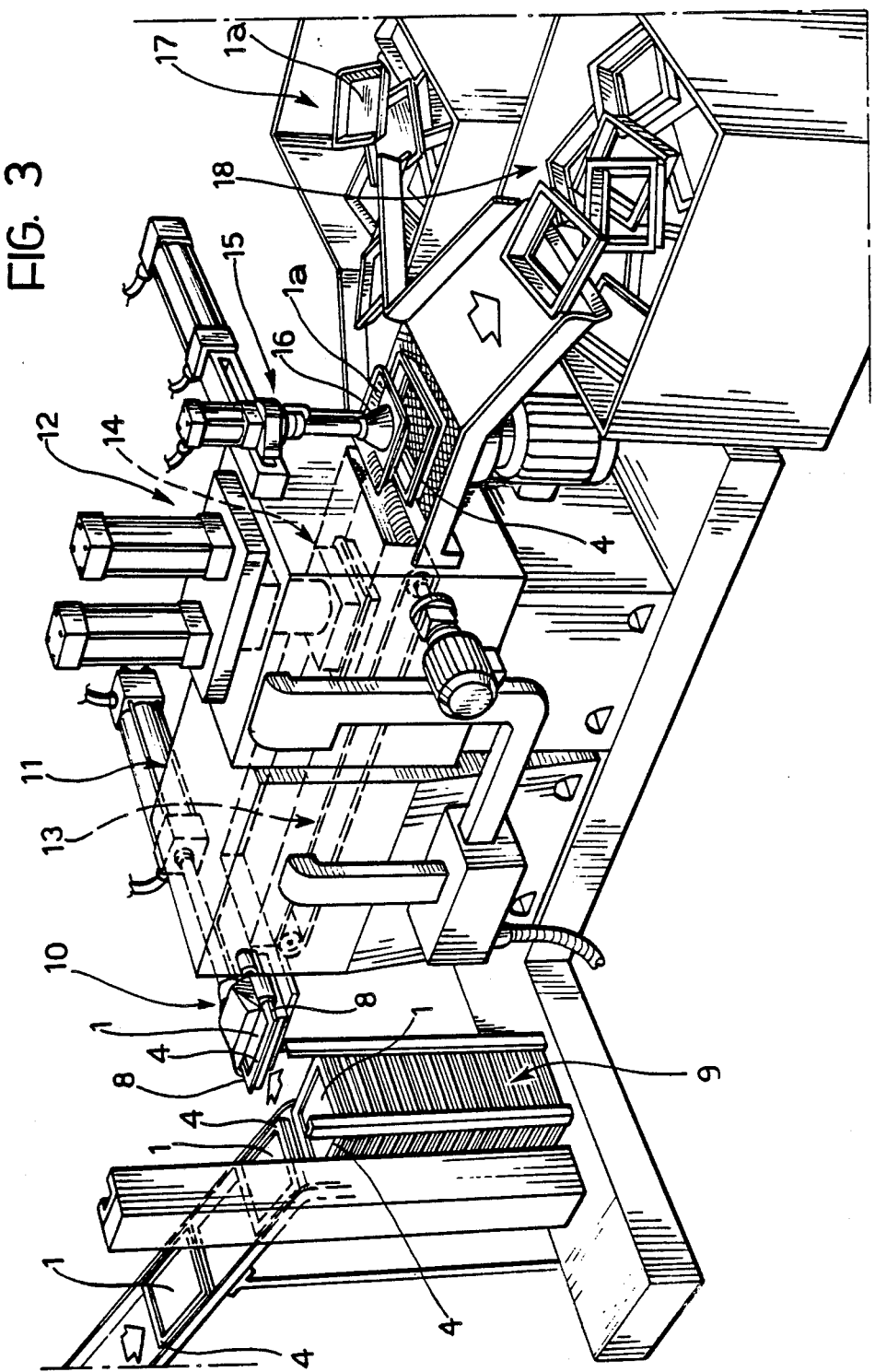

United States Patent [19]

Monetti

[11] Patent Number: 4,842,668
[45] Date of Patent: Jun. 27, 1989

[54] METHOD FOR THE AUTOMATED MANUFACTURE OF LAMINATED PLASTICS PRODUCTS

[75] Inventor: Giovanni Monetti, Racconigi, Italy

[73] Assignee: Monetti S.p.A., Italy

[21] Appl. No.: 113,980

[22] Filed: Oct. 29, 1987

[30] Foreign Application Priority Data

Oct. 31, 1986 [IT] Italy ................. 67819 A/86

[51] Int. Cl.⁴ ............. B29C 31/04; B29C 43/20; B32B 31/20
[52] U.S. Cl. ............................. 156/196; 156/222; 156/224; 156/228; 156/245; 156/288; 156/500; 264/241; 264/258; 269/56; 414/222; 414/786
[58] Field of Search ............. 156/196, 220, 221, 222, 156/224, 245, 538, 228, 288, 500; 425/121, 125, 126.1, 423, 436, 436 RM, 438, 441; 269/55, 56; 264/544, 545, 550, 551, 258, 241; 414/222, 786; 198/803.14, 803.15

[56] References Cited

U.S. PATENT DOCUMENTS

| | | | |
|---|---|---|---|
| 2,614,590 | 10/1952 | Hervey | 414/222 |
| 2,656,047 | 10/1953 | Samler | 414/222 |
| 2,656,048 | 10/1953 | Samler | 414/222 |

*Primary Examiner*—Caleb Weston
*Attorney, Agent, or Firm*—Sughrue, Mion, Zinn, Macpeak & Seas

[57] ABSTRACT

The invention relates to a method for the automated manufacture of laminated plastics products, in which a pack of superimposed layers of thermosetting material, for example, sheets of resin-impregnated paper, is first formed, and the pack is placed on a rigid support structure for supporting the pack and keeping it in the correct position; the rigid structure and the corresponding pack are supplied by gripping and transfer means to a moulding press which provides for hot-forming of the above pack and, when moulding is completed, the rigid structure and the respective thermoset plastics laminate are separated and directed to respective unloading stations.

7 Claims, 2 Drawing Sheets

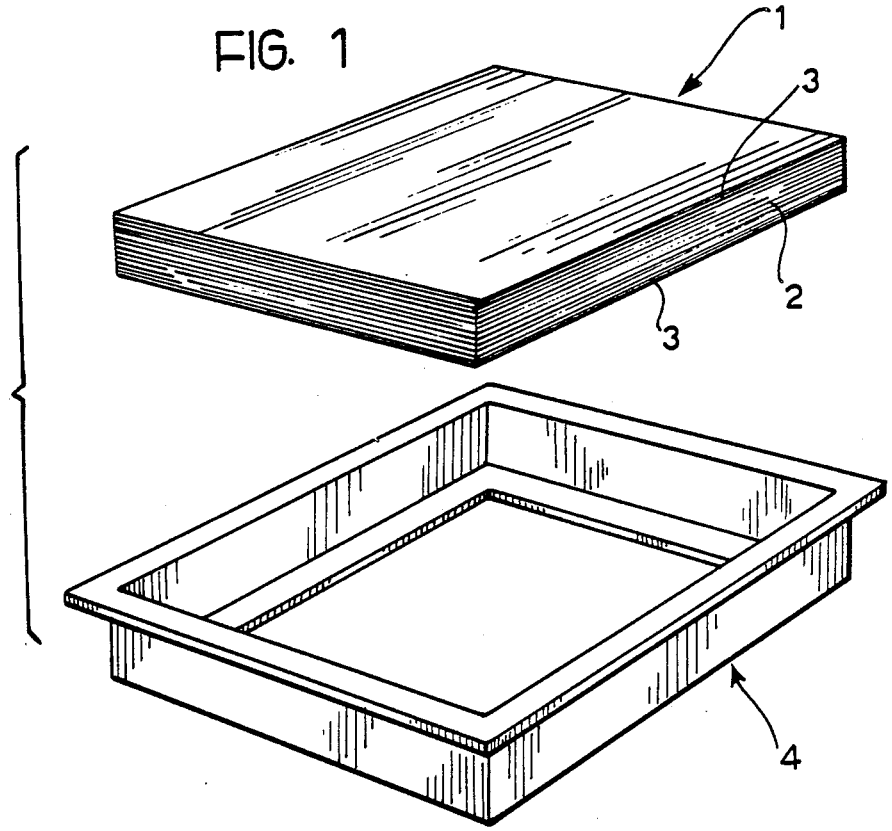
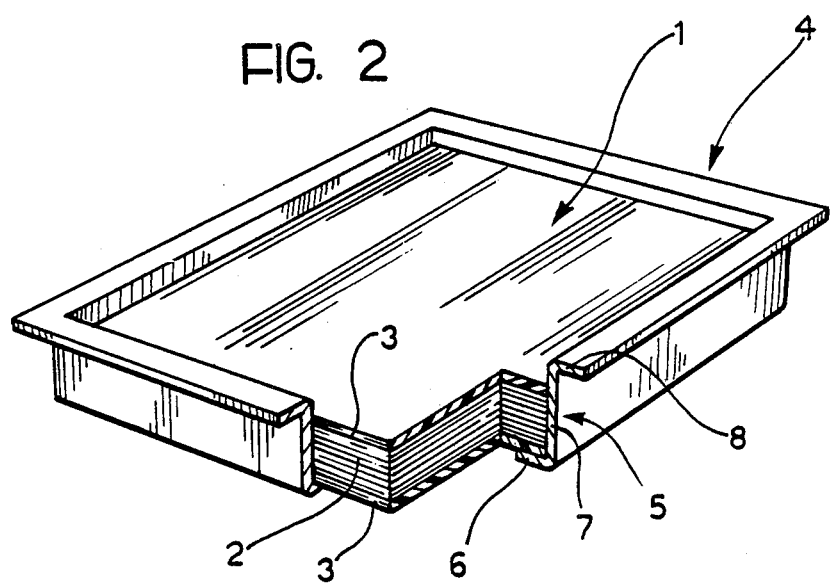

METHOD FOR THE AUTOMATED MANUFACTURE OF LAMINATED PLASTICS PRODUCTS

The invention relates to methods for the manufacture of laminated plastics products such as those which are normally obtained by placing several superimposed layers of material, for example paper or the like, impregnated with thermosetting resins in a press for thermoforming.

The layers are transformed by the combined action of the temperature and the pressure exerted by the die in order to obtain the required product.

In practice, however, there are several problems in carrying out these methods. For example, the resin-impregnated paper becomes more rigid, but also more brittle, and there is therefore a risk of breakage and damage.

Another problem arises when several packs are stacked and waiting to be supplied to the press: in these conditions, if the material constituting the facing sheets of adjacent packs is impregnated with certain resins, for example melamine resins, there is a tendency for the facing sheets to stick together.

According to the prior art, in order to avoid these problems, the packs are supplied directly to the press by one or more operators who see to the formation and handling of the packs.

In order to achieve automated formation of the laminated plastics products, therefore, it is necessary to avoid the occurrence of breakages in the layers making up the various packs and adhesion between adjacent layers of the packs.

The object of the invention is to achieve a method for the manufacture of laminated plastics products which does not have the above problems and enables automated manufacture of the products.

In order to achieve this object, the subject of the invention is a method for the automated manufacture of laminated plastics products, characterised in that it includes the steps of—forming a pack of superimposed layers of thermosetting material—placing the pack on a rigid support structure provided with means for supporting and keeping the pack in the correct position—supplying the rigid structure and the corresponding pack by gripping and transfer means to a moulding press for hot forming—after moulding, separating the rigid structure and the respective plastics laminate obtained by thermoforming of the corresponding pack of superimposed layers, the structure and the plastics laminate then being directed to respective unloading stations.

The invention will now be described with reference to a preferred embodiment illustrated in the appended drawings, provided purely by way of non-limiting example, in which:

FIG. 1 is a perspective view of a pack of superimposed layers of thermosetting material and a corresponding rigid support structure according to the invention, FIG. 2 is a partially sectioned view of the pack and the structure of FIG. 1 assembled in the operative working position, FIG. 3 is a schematic perspective view of gripping and transfer means cooperating with a moulding press for carrying out the method according to the invention.

A pack of superimposed layers of thermosetting material is indicated 1. The pack 1 comprises a central core 2 consisting of a plurality of superimposed sheets of paper impregnated with a thermosetting resin, for example a phenolic resin, and two covering layers 3 arranged one on one face and the other on the opposite face of the interposed core 2. Each covering layer consists of a sheet of decorative paper impregnated with melamine resin.

A rigid metal structure in the form of a frame is indicated 4. The structure 4 is rectangular in shape and is constituted by a metal profile which forms the four sides of the structure. In section, the metal profile has an L-shaped portion, indicated 5, comprising a lower horizontal part 6 and an adjacent vertical part 7. The part 6 extends horizontally inwardly so as to form a seat for supporting a corresponding pack 1 of superimposed layers. The metal profile also has an upper horizontal part 8 which extends outwardly from the frame to form an engagement seat for facilitating the gripping and transfer of the structure 4. A group of structures 4 superimposed on each other and each provided with a respective pack 1 of layers of thermosetting material is indicated 9. An arm for gripping a structure 4 with its respective pack 1 and transferring it is indicated 10. A preheating oven, indicated 11, is situated upstream of a hot-moulding press 12. A transporter device 13 connects the oven 11 and the press 12. The latter operates a die/matrix unit for hot-forming the pack 1 to transform it into a laminated plastics tray 1a. A pneumatic device 15 is arranged at the output of the press 12 and is provided with a suction cup 16 at its end.

A first container 17 for receiving the trays 1a and a second container 18 for receiving the structures 4 from the press 12 are arranged downstream of the press 12.

Production of the trays by the method according to the invention and with the means described takes place in the following manner. A plurality of structures 9 each provided with a respective pack 1 is arranged upstream of the press 12. The arm 10 lifts a structure 4 including the respective pack 1 from the group 9 and transfers it to the preheating oven 11. After the structure has been suitably preheated, it arrives at the supply device 13 which supplies the structure 4 to the press 12. In the press 12, the die/matrix unit operates on the pack of sheets 11 and hot-forms it so as to produce a tray, for example, for canteens or the like. Subsequently, when the thermoforming operating is complete, the structure 4 with the respective tray 1a is carried out of the press 12 by the device 13, whereupon the pneumatic device 15 intervenes to grip the tray 1a by means of its suction cup 11. The tray 1a is fitted and transferred into the respective container 17. The structure 4, in turn, is directed to the respective container 18.

With the method described above, the packs 1 do not come into contact with each other and the possibility of adhesion between the packs is thus eliminated. Moreover, as each pack is housed in its respective rigid structure 4, it is protected and breakage or damage of the sheets which constitute the pack is avoided. Finally, since it is possible to have an automatic supply of structures 4 with respective packs 1 and to form a stack 9 of these structures, the method and therefore the manufacture of the laminated plastics products can be carried out without the direct and continuous presence of the operator, thus enabling the latter to carry out activities in a wider field and with less rigid constraints.

I claim:

1. An apparatus for the production of laminated plastic trays obtained by thermoforming a pack of superimposed cellulose sheets impregnated with a thermosetting resin comprising:

a molding press for thermoforming a pack of cellulose sheets into the shape of a tray, a plurality of rigid support structures each in the form of a hollow rectangular frame having an L-shaped cross section with a horizontal flange extending inwardly to define a seat for supporting the corresponding pack of sheets and a vertical wall having a surface against which the sheets of the pack are located whereby the pack of sheets will be supported only about a peripheral edge portion thereof, gripping and transfer means for sequentially supplying each of said structures supporting a respective pack to said molding press, and pneumatic means disposed adjacent the output of the molding press and having suction means adapted to grip the thermoforming tray for separating the tray from the respective support structure.

2. A method for the automated manufacture of laminated plastics products including the steps of:

forming a pack of superimposed layers of thermosetting material, placing the pack in a rigid support structure in the form of a hollow rectangular frame having an L-shaped cross section with a horizontal flange extending inwardly to define a seat for supporting the corresponding pack of superimposed layers and a vertical wall having a surface against which the various layers of the pack are located so as to assume the correct position, supplying the rigid structure and the corresponding pack by gripping and transfer means to a molding press for hot forming, molding the pack into a plastics laminate of the desired form, separating the rigid structure and the respective plastics laminate obtained by thermoforming of the corresponding pack of superimposed layers, and directing the rigid structure and the plastics laminate to respective unloading stations.

3. A method according to claim 1, wherein the gripping and transfer means comprise a movable structure provided with appendages for gripping the rigid support structure carrying the respective pack of superimposed layers, and a transporter device for receiving the rigid structure from the movable structure and transporting it along a predetermined path through a preheating oven and a moulding press arranged on the said path downstream of the oven.

4. A method according to claim 2, wherein the profile forming the frame structure also has an upper part turned towards the outside of the frame to form a support seat for the gripping and transfer means.

5. A method according to claim 4, wherein the pack of superimposed layers of thermosetting material is constituted by a core provided with a covering layer on at least one of its two opposite faces.

6. A method according to claim 5, wherein the core is constituted by several sheets of paper impregnated with thermosetting resin.

7. A method according to claim 6, wherein the covering layer is constituted by at least one sheet of decorative paper impregnated with melamine resin.

* * * * *